United States Patent [19]

Antes

[11] Patent Number: 5,101,184
[45] Date of Patent: Mar. 31, 1992

[54] DIFFRACTION ELEMENT AND OPTICAL MACHINE-READING DEVICE

[75] Inventor: Gregor Antes, Zurich, Switzerland

[73] Assignee: LGZ Landis & Gyr Zug AG, Zug, Switzerland

[21] Appl. No.: 413,871

[22] Filed: Sep. 28, 1989

[30] Foreign Application Priority Data

Sep. 30, 1988 [CH] Switzerland .................. 03643/88

[51] Int. Cl.⁵ .................. G06K 7/10; G06K 19/00; B42D 15/00
[52] U.S. Cl. .................. 235/454; 235/457; 235/487; 283/91
[58] Field of Search ........... 235/456, 454, 457, 487; 283/86, 904, 89, 90, 91; 350/3.64, 3.68, 3.71, 3.72, 3.75

[56] References Cited

U.S. PATENT DOCUMENTS

| | | | |
|---|---|---|---|
| 4,108,367 | 8/1978 | Hannan | 235/457 |
| 4,184,700 | 1/1980 | Greenaway | 283/6 |
| 4,211,918 | 7/1980 | Nyfeler et al. | 283/904 |
| 4,250,217 | 2/1981 | Greenaway | 283/904 |
| 4,501,439 | 2/1985 | Antes | 283/904 |
| 4,544,836 | 10/1985 | Galvin et al. | 235/487 |
| 4,568,141 | 2/1986 | Antes | 283/904 |
| 4,761,543 | 8/1988 | Hayden | 235/457 |
| 4,984,824 | 1/1991 | Antes et al. | 283/91 |

FOREIGN PATENT DOCUMENTS

2814890 4/1978 Fed. Rep. of Germany ...... 235/457
594936 1/1978 Switzerland .

OTHER PUBLICATIONS

"Optical Holography", by P. Hariharan, Cambridge University Press, 1984, pp. 58-59.

Primary Examiner—Stuart S. Levy
Assistant Examiner—Edward H. Sikorski
Attorney, Agent, or Firm—Marmorek, Guttman & Rubenstein

[57] ABSTRACT

An article of manufacture contains a substrate which supports a diffraction element divided into surface portions having optically-active microscopic relief structures. At least one pair of surface portions is mirror-symmetric with respect to the orientation of the corresponding relief structures. Each surface portion of the pair has an optically-active, microscopic, asymmetric relief structure defined by an orientation azimuth angle. The azimuth angles are 180° apart. The mirror symmetric pairs constitute optical markings which are machine-readable. The readout device generates an incident light beam and contains photosensors and electronics to output the intensity difference between pairs of diffracted light beams. Alternatively, each surface portion of the diffraction element has a volume hologram rather than a microscopic relief structure for diffracting incident light.

10 Claims, 1 Drawing Sheet ate such as a volume hologram or microscopic relief structure for diffracting incident light.

DIFFRACTION ELEMENT AND OPTICAL MACHINE-READING DEVICE

FIELD OF THE INVENTION

The instant invention relates to an article of manufacture including a substrate for supporting a diffraction element divided into surface portions so as to form a visible image. Each surface portion is provided with a volume hologram or with an engraved or embossed optically active microscopic relief structure with a spatial frequency of more than 50 lines per mm. The present invention also relates to a device for optical machine-reading of information from the diffraction element.

Such diffraction elements can for instance be used as security elements for valuable documents such as bank notes, checks, credit cards, etc.

BACKGROUND OF THE INVENTION

A diffraction element of the type used for authentication purposes is described in Swiss patent 00805/88-4 which corresponds to U.S. Pat. application Ser. No. 311,596 now U.S. Pat. No. 4,984,824. This diffraction element is provided with relief structures containing authenticity information, for example in the form of images, the colors and luminosity of which depend on the angle of observation, and which can therefore not be copied by means of conventional copying machines. The relief structures can be provided with cross-sectional configurations of known periodic functions with spatial frequencies of over 10 lines per millimeter which are effective for the diffraction of visible light. Limits imposed in manufacture restrict the practically usable range to approximately 2500 lines/mm. In addition, cross-sectional forms with aperiodic functions containing local spatial frequencies from that range, such as matte structures, can be used. The height difference of these relief structures is typically selected to lie between 50 nm and 10,000 nm.

A diffraction element known from Swiss patent 594,936 is provided with machine-readable, diffraction, optically-encoded markings that are difficult to copy. They are embossed in the form of microscopic relief structures into a thin thermoplastic support which can be applied on paper, for example, they are protected by means of an optically effective coating material, and they diffract incident light.

Pairs of optically-encoded markings are known from U.S. Pat. No. 4,108,367. It discloses a token for use in a vending machine which consists of a plastic card having at least one pair of side-by-side holograms embossed on it. A token reader guides the card into the path of a readout beam. Two photo-sensors located at predetermined positions receive first order beams diffracted from the illuminated holograms and convert them into output electrical signals. Electronic circuitry, including a comparator, enables the authenticity of the card to be determined by comparing the electrical signal pairs.

OBJECTS AND SUMMARY OF THE INVENTION

It is the object of the instant invention to create a security element which is difficult to copy, in the form of an optically active diffraction element which can be machine optically read. The diffraction element is divided up into surface portions which form a visible image. Each surface portion contains a diffraction struc- In an illustrative embodiment, the diffraction element includes at least one pair of adjoining surface portions which are mirror symmetric with respect to the orientation of their respective relief structures. More particularly, each mirror symmetric pair of surface portions has a first azimuth angle $\Phi$ characterizing the orientation of the relief structure of one surface portion and a second azimuth angle $\Phi'$ characterizing the orientation of the relief structure of the second surface portion, whereby the two azimuth angles $\Phi$ and $\Phi'$ differ by 180°. Illustratively, as the relief structures are asymmetric and differ only by their characteristic azimuth angles $\Phi$ and $\Phi'$ which are 180° apart, the surface portions of the pair are mirror-image symmetric with respect to the profiles of their relief structures.

A reading apparatus, for optical machine-reading of the mirror-image symmetric pairs and their asymmetric relief structures, comprises an incident reading, monochromatic light beam and optical sensors symmetrically arranged on both sides of the reading beam in a plane defined by the reading beam and the azimuth angle of the relief structure.

DETAILED DESCRIPTION OF PREFERRED EMBODIMENTS

Figure 1:
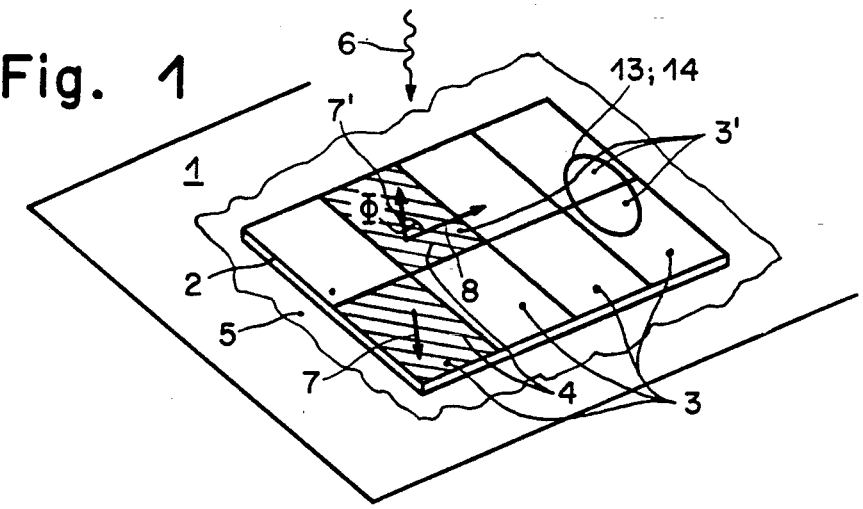
FIG. 1 shows an embodiment of a diffraction element with surface portions.

In FIG. 1, reference 1 designates a document, 2 a diffraction element and 3 and 3' surface portions. The document 1 is a security, a bank note, an identity document, a credit card, etc. At least at one predetermined location, the document 1 is equipped with the diffraction element 2 as a security element. The diffraction element 2 comprises volume holograms or embossed or engraved microscopic relief structures 4. Illustratively, there is a distinct relief structure 4 for each surface portion 3,3'.

If the document 1 comprises a thermoplastic synthetic material, the diffraction element 2 is embossed or engraved directly on the document 1.

If the document 1 is made of paper, the diffraction element 2 is advantageously embossed or engraved on a support. The support 5 can be made in the form of a self-adhesive label, for example, which adheres to the document 1 with such strength that the relief structure 4 is destroyed if an attempt is made to separate the support 5 from the document 1. As is known from Swiss patent 594 936, a thin thermoplastic color layer or a hot-embossed film applied to paper can be used.

A relief structure 4 has a spatial frequency f of at least 50 lines per mm and is therefore able to diffract the incident light 6 falling thereon by a predetermined angle. This property of the relief structure 4 is determined by at least three parameters: the profile of the relief structure, the spatial frequency f, and the orientation of the relief structure 4 which is defined by means of a grating vector 7 or 7' perpendicular to the lines in the relief structure.

The grating vector 7 or 7' lies in the plane of the diffraction element 2 and, in relation to a predetermined direction 8, has for example, an azimuth angle Φ, measured in the counter-clockwise direction on that plane, describing the orientation of the relief structure 4.

A relief structure 4 may have a symmetric or asymmetric relief profile. If the relief profiles are asymmetric, the orientations of the relief structures 4 have distinguishable azimuth angles Φ in the range between 0° and 360°, while the azimuth angles Φ are limited to a range between 0° and 180° for the case of symmetric relief profiles.

The diffraction of the incident light 6 at a relief structure 4 can be observed via reflection and via transmission; in the latter case the choice of material to be used for the document 1 and, if applicable, for the support 5 is very much limited. A greater choice of materials is available in the case of reflection. In any event, the relief structure 4 is covered in a known manner with an optically active coating protecting the relief structure 4.

The diffraction element 2 is divided into at least two surface portions 3, 3'. The drawn borders of the different surface portions 3, 3' are used only in the drawing, since each surface portion 3 or 3' has a microscopic relief structure 4 which is different in at least one parameter from the adjoining relief structures 4.

It is advantageous to divide the diffraction element 2 into a plurality of surface portions 3, 3' in the manner of a mosaic, whereby this division is of a graphic nature. Under normal, polychromatic illumination, an image dependent upon the direction and type of illumination is visible when viewing the diffraction element 2. The colors of the surface portions 3, 3' depend on the parameters of the relief structures 4, on the direction of viewing and on the incident light 6. In daylight this diffraction element has surface portions 3, 3' with colors of great luminosity if the diffracted light is observed.

Since an image composed of elements of different brightness it is also essential to have elements of low luminosity. Matte structures meet this requirement but have the disadvantage that they can be faked by means of light absorbing color paints or pigments and that they cannot transmit any additional information.

Specifically, incident light falling on a matte structure, which is per se a random structure, is evenly distributed into $2\pi$ (half-sphere). Therefore, the dispersed light has the same color as the incident light and contains no information about the matte structure. In contrast, light diffracted at a grating contains information about the parameters of the grating, e.g., in the direction of intensity maxima.

If the surface portions 3, 3' have a largest dimension of less than 0.1 mm in at least one part of the diffraction element 2, the naked eye can no longer distinguish the form of the surface portions 3, 3'. If the relief structures of such small surface portions 3, 3' have a random orientation of the grating vector 7 or 7' in the plane of the diffraction element 2, the light 6 of an environmental light source diffracted on these small, coherent surface portions 3, 3' merge for the observer into the optical effect of a matte surface which clearly stands out from the luminous colors of the diffracted light from the larger surface portions 3, 3'. Surface portions 3, 3' having this effect are therefore suitable for the graphic representation of the image instead of using a matte structure.

Figure 2:
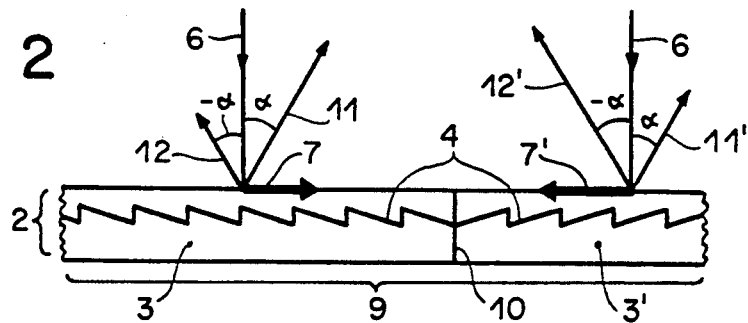
FIG. 2 shows a mirror-symmetric pair of surface portions with asymmetric relief profiles.

In FIG. 2, the relief structure 4 of at least one first surface portion 3 and the relief structure 4 of at least one second surface portion 3' have predetermined asymmetric relief profiles with equal spatial frequency f and with the azimuth angles Φ and Φ' of the two grating vectors 7 and 7' being different by 180° from each other. The two relief structures 4 are symmetric with respect to the common border 10, with the orientation of the relief structures 4 being indicated by means of the grating vectors 7, 7' lying in the plane of the drawing and being oriented opposite each other. The two surface portions 3, 3' abut each other directly and constitute a mirror-symmetric pair 9 with respect to the orientation of their relief structures. The common border 10 is chosen independently of the relief structure.

If monochromatic light 6 falls perpendicularly on the surface portions 3, 3' with reflecting relief structures 4, a ray of the incident light 6 and the grating vectors 7, 7' define a diffraction plane which coincides with the plane of the drawing in FIG. 2. The surface portions 3, 3' diffract the light 6 into a first ray 11 or 11' by a diffraction angle $\alpha$ and into a second ray 12 or 12', symmetrically in relation to the ray of the incident light 6, by a diffraction angle $-\alpha$.

Due to the asymmetry of the profiles of the relief structures 4 the intensities of the rays 11, 12 or 11', 12' are not distributed symmetrically in relation to the incident light 6 in the diffraction plane. In the drawing the incident light 6 is diffracted at the first surface portion 3 for example, whereby the intensity of the first ray 11 is greater than the intensity of the second ray 12. The distribution of the intensities of the rays 11', 12' for the second surface portion 3' of the mirror-symmetric pair 9 is mirror-symmetrically equal with the intensity of the ray 12' being greater than the intensity of the ray 11'. If the diffraction element 2 is now viewed at the angle $\alpha$, the first surface portion 3 therefore appears to be lighter than the second surface portion 3'. The ratio of the light intensities of the surface portions 3, 3' are reversed if the diffraction element 2 is viewed at the angle $-\alpha$. By contrast other parts of the diffraction element 2 in which the relief structures 4 have symmetric relief profiles do not change in lightness. This modification of the image, for example when the document 1 is tilted, is visually very apparent. Therefore this switching of lightness of the surface portions 3, 3' is an authenticity characteristic that can be easily recognized and remembered.

The ratio between the intensity of the first rays 11, 11' and the intensity of the second rays 12, 12' attains a typical value of 3, and can even reach values of more than 30 in relief profiles with optimal configuration.

In an embodiment of the diffraction element 2 (FIGS. 1 and 2) the graphic representation is constituted graphically by a division into first surface portions 3. Each first surface portion 3 is provided with an asymmetric relief profile and with an azimuth angle Φ of the relief structure in the range between 0°, and 180°. This first division is overlaid with at least one additional optical marking 13 with a border 14. Each first surface portion 3 located within the border 4 is replaced by the second surface portion 3' of the corresponding mirror-symmetric pair 9. The border 14 can also divide one of the surface portions 3, 3' into a mirror-symmetric pair 9. The marking 13 is therefore determined through the asymmetry of the relief profile. To the naked eye, this marking 13 only causes slight interference with the image impression.

All the asymmetric relief structures 4 have for example the same spatial frequency f. The surface portions 3, 3' differ from each other only in the azimuth angle Φ and Φ' of the relief structure 4. The angle Φ is advantageously limited in the first surface portions 3 to the range between 30° and 150° and the angle Φ' in the second surface portions 3' to the range between 210° and 330°, so that the predetermined direction 8 may be distinguished for reading. When the document 1 is tilted about an axis which is perpendicular to the direction 8 and lies in the plane of the diffraction element 2, the optical markings 13 and the image exchange their intensities if this occurs symmetrically to the direction of the incident light 6.

The optical marking 13 is in the form of numbers, letters or other graphic symbols. They can also be used as elements of artistic configurations of the diffraction element 2.

The marking 13 can also be in the form of a machine-readable bar code known in the retail trade and can contain readable information. The second surface portions 3' will then correspond to printed elements ("bars") of the bar code in front of a "background" formed from the first surface portions 3.

Figure 3:
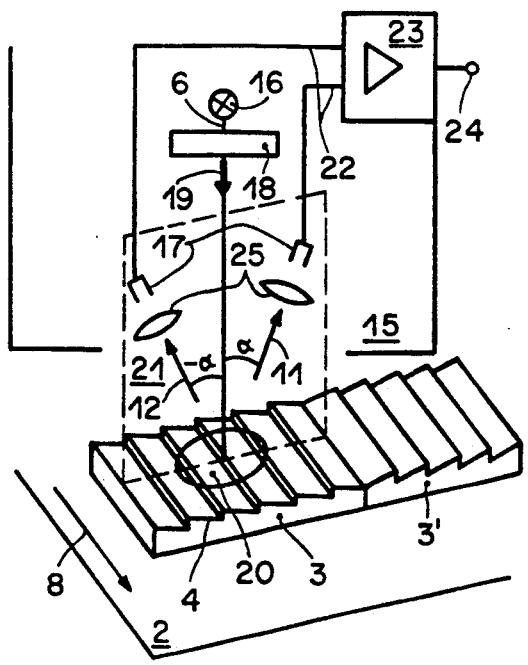
FIG. 3 shows a device for the reading of authenticity markings.

A reader 15 shown in FIG. 3 for the optical machine-reading of information from the diffraction element 2 is provided with a light source 16 and with photo-sensors 17. An optical collimator 18 forms a read-out beam of light which illuminates a surface 20 of predetermined configuration of the relief structure 4, e.g., a circle, a rectangle, etc.

The light source 16 is preferably a semiconductor laser since monochromatic light 6 of high intensity is in any case more suitable for machine-reading.

If the read-out beam 19 of the reader 15 falls perpendicularly on the document 1 (not shown) the read-out beam 19 defines a read-out plane 21 perpendicular to the predetermined direction 8 of the diffraction element 2. In this plane 21 two photo-sensors 17 are provided symmetrically in relation to the read-out beam 19, and they receive the rays 11, 12 or the rays 11', 12' under the diffraction angle α, −α and convert them into electrical signals.

An electronic circuit 23 connected to the photo-sensors 17 via leads 22 produces the difference of these signals of the two photo-sensors 17 at an output 24, said difference being a measure of the asymmetry of the relief structure 4 illuminated in surface 20. If the information encoded in the markings 13 is encoded in self-timing fashion, the circuit 23 can produce a binary signal sequence with a clocking signal for example, for a processing device, which is not shown here.

It is also possible for at least one relief structure 4 to be provided with a modulated spatial frequency $f_o$ with a spatial frequency amplitude A. In the relief structure 4 all the spatial frequencies f in a range from $f_o-A$ to $f_o+A$ are therefore active. This causes the rays 11, 11', 12, 12' to be subjected to a predetermined fanning-out in the plane of diffraction, increases reading reliability where the support 5 is not absolutely uniform, and decreases the requirements of reading distance and of direction of the incident read-out ray 19.

The utilization of several spatial frequencies $f_o$ in the surface portions 3, 3' increases the freedom of artistic configuration.

In a reader 15 for the embodiment of the diffraction element 2 with at least one spatial frequency range and one azimuth angle range, the photo-sensors 17 have a large aperture with a predetermined range of the angle of diffraction α and of the azimuth angle Φ. The large aperture is attainable by means of large-surface photo-sensors 17 or by image-forming optical means 25 between each photo-sensor 17 and the illuminated surface 20.

In an embodiment of the reader 15 the aperture for the angle of diffraction α has a range from 10° to 70°, and for the azimuth angle Φ a range from +25° to 155° and for the azimuth angle Φ' a range from 205° to 335°. This large aperture ensures reliable reading of the optical markings 13 even when the reader 15 is not precisely aligned with the diffraction element 2.

The optical means 25 are shown in the form of lenses in FIG. 3. These lenses can be replaced by reflecting diffraction grating which focus the rays 11, 12 in the corresponding photosensors.

In particular, the description has concentrated on embodiments of the invention wherein a diffracting element comprises surface portions, each of which contains a diffraction structure in the form of a microscopic relief structure. Alternatively, the diffraction structure associated with each surface portion is a volume hologram. Volume holograms are described in P. Hariharan, "Optical Holography", Cambridge University Press, 1984, pp 58–59. Like the symmetric and asymmetric relief structure described above, the volume holograms diffract incident light symmetrically or asymmetrically depending on the inclination of the reflective planes within the volume hologram layer (Braff reflection) 26.9.89.

Finally, the above-described embodiments of the invention are intended to be illustrative only. Numerous alternative embodiments may be devised by those skilled in the art without departing from the spirit and scope of the following claims.

I claim:

1. A combination for authenticating an article of manufacture comprising a diffraction element having a plurality of surface portions each including a microscopic relief structure with a spatial frequency of over 50 lines per mm to form a visual image, said diffraction element including at least one pair of surface portions comprising a first surface portion having a first asymmetric relief structure and a second surface portion having a second asymmetric relief structure, said first and second relief structures being mirror symmetric and characterized by azimuth angles 180 degrees apart to form an authenticity characteristic within said visual image without disturbing said visual image, and an optical readout apparatus comprising a housing, a light source located in the housing for generating a light beam which is incident on said diffraction element, first and second photosensors located in said housing symmetrically with respect to said light beam which detect light diffracted by said diffraction element, each of the surface portions of the pair diffracting light to said first and second photosensors with unequal intensity such that the difference in intensity of the light diffracted to the first and second photosensors is equal but opposite for each of the surface portions of the pair, and an electronic circuit coupled to said first and second photosensors for generating a signal proportional to the difference between the outputs of said photosensors, wherein said signal outputted by said electronic circuit identifies the presence of said pair of surface portions in said diffraction element so as to authenticate said article of manufacture.

2. The combination of claim 1 wherein said combination further includes image forming optical means between each of said photosensors and said diffraction element.

3. The combination of claim 1 wherein said surface portions of said pair have a common border.

4. The combination of claim 1 wherein said surface portions in at least one region of said diffraction element have a largest dimension of less than 0.1 mm and wherein in said one region the values of the azimuth angles of said surface portions have a random distribution.

5. The combination of claim 1 wherein a range of azimuth angles attributed to a first set of said surface portions including one surface portion of said pair is between 30° and 150°.

6. The combination of claim 1 wherein said diffraction element is divided into said surface portions to form markings having predetermined borders.

7. The combination of claim 1 wherein a range of azimuth angles attributed to a first set of said surface portions of said diffraction element including one surface portion of said pair is between 30° and 150° and said diffraction element includes an additional optical marking comprising a machine-readable bar code encoded in a self-timing manner.

8. The combination of claim 1 wherein said diffraction element further comprises a substrate which forms a self-adhesive label.

9. The combination of claim 1 wherein said diffraction element includes at least one relief structure with a modulated spatial frequency.

10. The combination of claim 1 wherein a first one of said photosensors has an aperture for the azimuth angle of 25 degrees to 155 degrees and the other one of said photosensors has an aperture for the azimuth angle of 205 degrees to 335 degrees.

* * * * *